Oct. 7, 1947.　　　F. M. BROWN　　　2,428,649
ILLUMINATED MIRROR
Filed Nov. 15, 1945　　　2 Sheets-Sheet 1
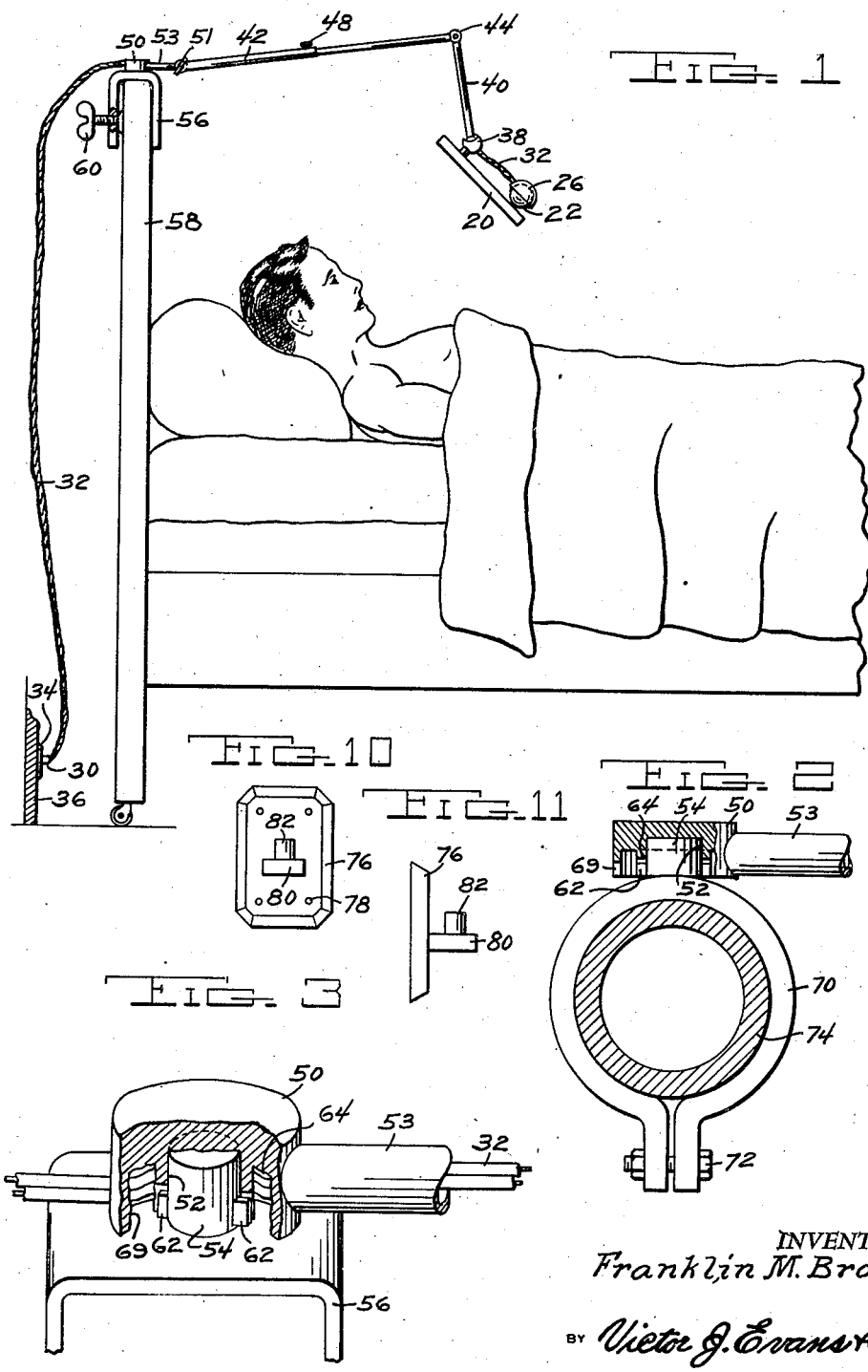
INVENTOR.
Franklin M. Brown
BY Victor J. Evans & Co.
ATTORNEYS Oct. 7, 1947.   F. M. BROWN   2,428,649
ILLUMINATED MIRROR
Filed Nov. 15, 1945   2 Sheets-Sheet 2
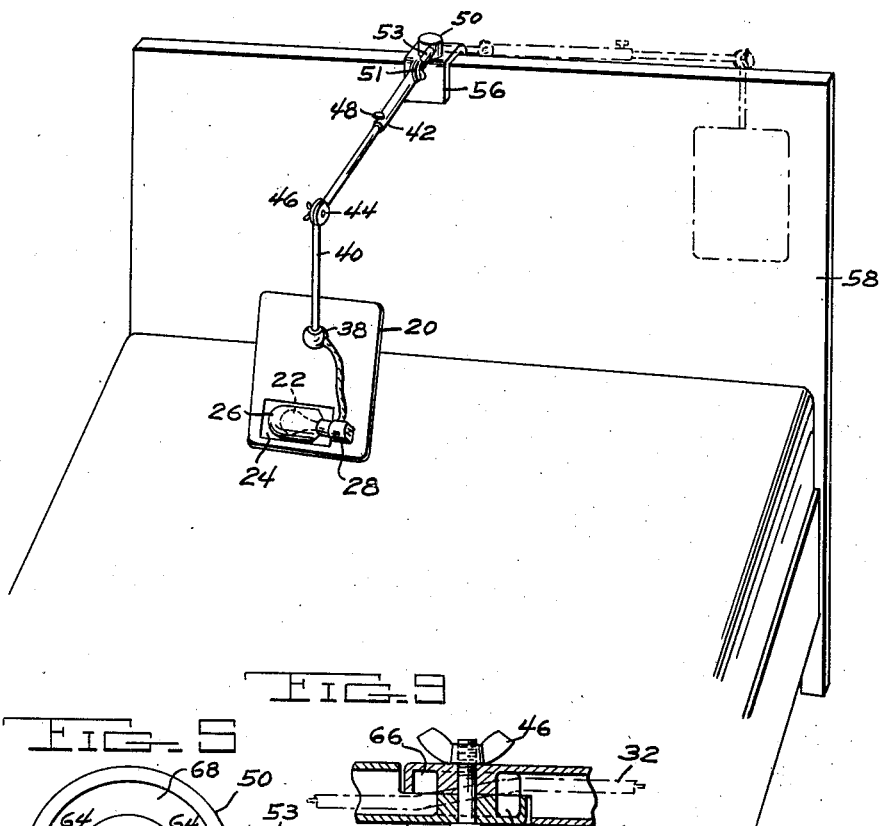
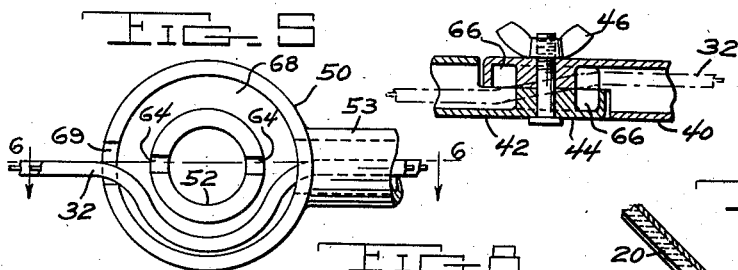
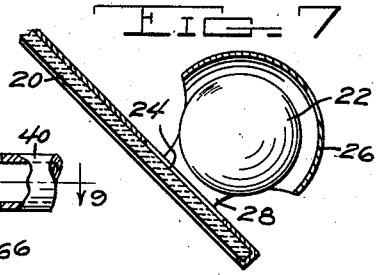
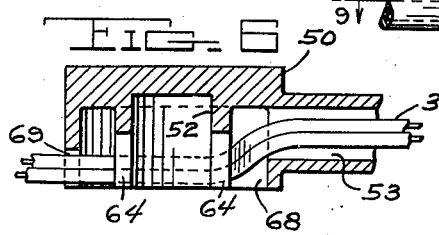
INVENTOR.
Franklin M. Brown
BY Victor J. Evans & Co.
ATTORNEYS Patented Oct. 7, 1947

2,428,649

UNITED STATES PATENT OFFICE 2,428,649

ILLUMINATED MIRROR

Franklin M. Brown, York, Pa.

Application November 15, 1945, Serial No. 628,790

1 Claim. (Cl. 240—4.1)

This invention relates to a mirror which is especially adapted to permit a person to shave himself in bed with an electric shaver.

The primary object of the invention therefore is the provision of a means for supporting a mirror in a convenient position to permit a person lying in bed to shave himself with an electric shaver.

Another object of the invention is to provide a mirror which carries its own illumination, thus eliminating the necessity of having to have additional illuminating means.

A further object of the invention is to provide a support for the mirror that can be easily attached or detached from a bed, that is simple in operation, composed of a few durable parts and can be inexpensively manufactured.

With the above and other objects and advantages in view the invention consists of novel details of construction, arrangement and combination of parts more fully hereinatfer described, claimed and illustrated in the accompanying drawings in which:

Figure 1 is a side elevational view of an embodiment of the invention in position on a bed and its relation to a person therein;

Figure 2 is a view partly in section of the bracket in use on a metal bed;

Figure 3 is a perspective view of the bracket shown in Figure 1, partly in section;

Figure 4 is a front elevational view;

Figure 5 is a bottom plan view of the bracket;

Figure 6 is a sectional view on the line 6—6 of Figure 5;

Figure 7 is a sectional view of the mirror and shield for the illuminating means;

Figure 8 is a side view partly broken away of the swivel joint;

Figure 9 is a sectional view on the line 9—9 of Figure 8;

Figure 10 is a front view of a bracket to be used with another type of bed and

Figure 11 is a side view thereof;

Referring more in detail to the drawings the reference numeral 20 indicates a mirror which is adapted to support an illuminating means such as an electric light bulb 22 on the rear thereof. An oblong silver free portion 24 on the mirror permits rays of the bulb to diffuse themselves over the face of the mirror, which is frosted, and the bulb is provided with a reflector shield 26, curved to conform to the shape of the bulb. The socket 28 for the bulb can be provided with a switch or it can be controlled merely by inserting the plug 30, connected on the opposite end of the electric cord 32 into the wall socket 34 in the base board 36. The electric shaver, not shown, can also be connected to the socket 28 when in use.

Secured to the rear of the mirror 20 by means of a universal joint 38 is the tubular arm 40 which is pivotally connected to the telescoping arm 42 by means of a swivel joint 44 tensioned by the fastener 46.

The arm 42 is retained in adjusted positions by the screw 48 and is connected to the cap 50 by means of a second swivel joint 51 similar in construction to the joint 44, and the short arm 53. The cap 50 has a bore 52 to be mounted on the stub shaft 54 of the U-shaped bracket 56 which is adapted for insertion over the bed head 58 and retained thereon by the winged screw 60.

The shaft 54 is provided with a key 62 which is received in the opposed slots 64 in the cap 50 which communicate with the bore 52 and are at right angles thereto, thus the cap is retained in position for shaving on the shaft 54.

The cord 32 is trained through the tubular arm 40 and through the opposed channels 66 in the swivel joint 44, the tubular telescoping arm 42, and the circular channel 68 in the cap 50 to emerge at 69 to be connected to the plug 30 as previously described.

Thus the mirror can be adjusted at any angle without interference from the cord or damage thereto.

In Figure 2, the cap 50 is supported on a split collar 70 tensioned by the fastener 72 for connection to metal bed 74, the remainder of the construction being as previously described.

In Figures 10 and 11, a plate 76 is adapted to be supported on the wall, by means of fasteners inserted in apertures 78 and the plate is provided with an arm 80 extending forwardly at right angles thereto to support the stud shaft 82 to support the cap 50. This type of bracket is used in conjunction with a studio couch or bed without a head board.

In Figure 4 it is shown by dotted lines how the support may be swung out of operative position against the bed head 58, or the arm may be positioned to place the mirror out of sight behind the bed head. The cap may also be removed from the clamp, and the mirror and the support therefor, placed elsewhere.

There has thus been provided a mirror and support which will permit a person to recline in bed and shave with the use of an electric shaver.

It is believed that the construction and operation of the device will be apparent to those skilled in the art and it is to be understood that changes may be made in the detail of construction, arrangement and combination of parts without departing from the spirit of the invention or the scope of the appended claim.

Having thus described the invention what is claimed as new and desired to be secured by Letters Patent is:

A device of the character described, comprising a mirror, illuminating means fixed to the rear of said mirror, an unsilvered portion on the rear of said mirror to permit rays from the illuminating means to be diffused over the face of the mirror, a socket on the rear of said mirror for fixing said illuminating means to said mirror, an outlet means associated with said socket to connect an electric shaver to said socket, an arm connected to the rear of said mirror above said socket, a universal joint for connecting said arm to said mirror, a telescoping arm, a swivel joint for connecting said first arm to said telescoping arm, an electric cord trained through said arm and said telescoping arm to be connected to said socket, a bracket, a cap having a bore therein formed on one end of said telescoping arm and a pin formed on said bracket at right angles thereto adapted to be received in said cap for connecting said telescoping arm to said bracket, and said bracket is adapted to be secured to a bed head to permit a person sitting in bed to shave himself with the aid of said mirror.

FRANKLIN M. BROWN.

REFERENCES CITED

The following references are of record in the file of this patent:

UNITED STATES PATENTS

| Number | Name | Date |
| --- | --- | --- |
| 1,657,334 | Adams | Jan. 24, 1928 |
| 2,267,132 | Pavenick | Dec. 23, 1941 |
| 282,318 | Hinds | July 31, 1883 |

FOREIGN PATENTS

| Number | Country | Date |
| --- | --- | --- |
| 284,368 | Italy | Apr. 10, 1931 |